United States Patent Office 3,476,955
Patented Nov. 4, 1969

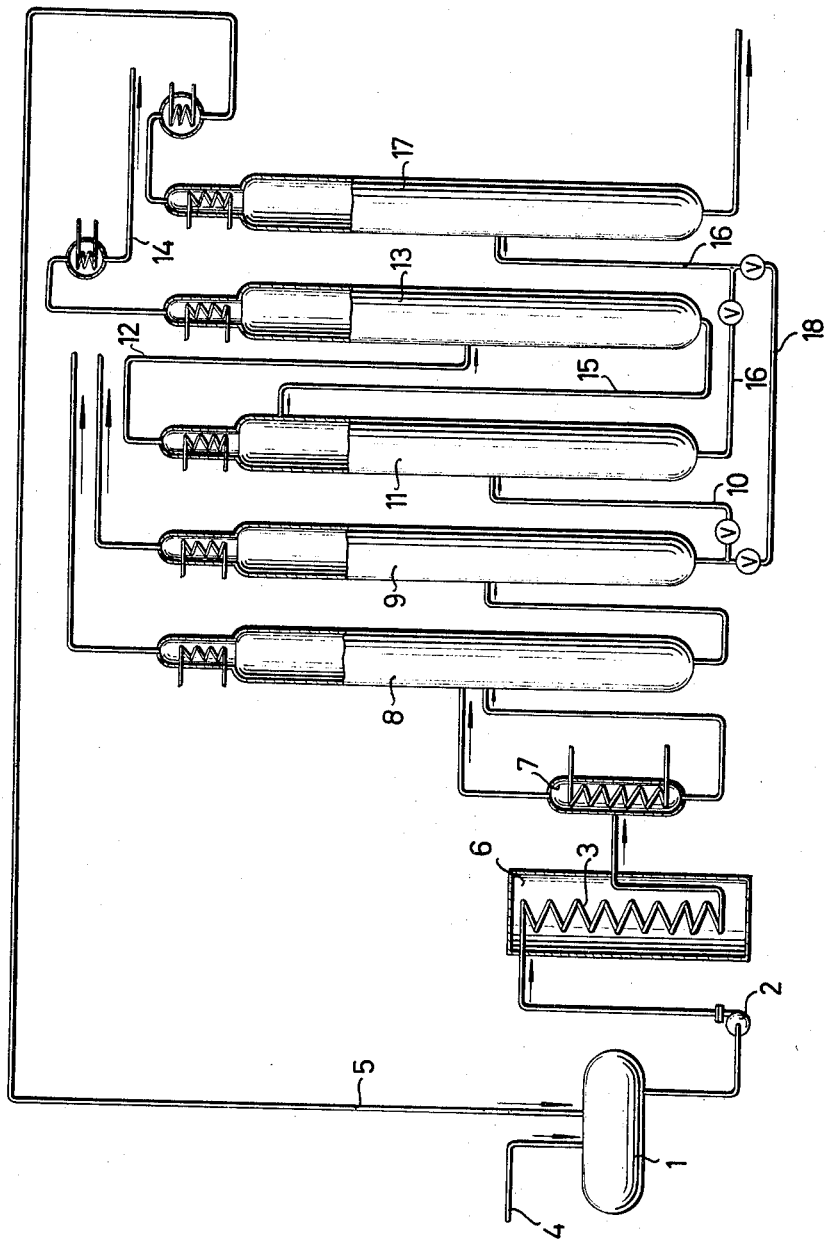

3,476,955
PROCESS FOR THE MANUFACTURE OF VINYL CHLORIDE FROM CONTAMINATED 1,2-DICHLOROETHANE
Hans Krekeler, Wiesbaden, Armin Jacobowsky, Knapsack, near Cologne, Klaus Born, Hermulheim, near Cologne, Heinz Schmitz, Frankfurt am Main, and Peter Wirtz, Cologne-Lindenthal, Germany, assignors to Knapsack Aktiengesellschaft, Knapsack, near Cologne, Germany, a corporation of Germany
Filed Aug. 5, 1966, Ser. No. 570,585
Claims priority, application Germany, Sept. 11, 1965, K 57,106
Int. Cl. C07c 21/06
U.S. Cl. 260—656                     1 Claim

ABSTRACT OF THE DISCLOSURE

Subjecting 1,2-dichloroethane to incomplete thermal cracking at elevated pressure and temperature in the absense of catalysts, removing hydrogen chloride in a first distillation stage, removing vinyl chloride in a second distillation stage and recycling unreacted dichloroethane after redistillation, to the process.

---

The invention relates to a process for making vinyl chloride by subjecting 1,2-dichloroethane to an incomplete thermal cracking reaction, at elevated pressure and at temperatures varying between about 450 and 650° C., in the absence of catalysts wherein the gas mixture leaving the cracking zone and formed of vinyl chloride, hydrogen chloride, unreacted 1,2-dichloroethane, and of byproducts including low and high-boiling fractions boiling at a temperature lower or higher than about 83° C. (760 mm. mercury), in partially condensed to be introduced into a first distilling stage, in which the hydrogen chloride is distilled off, and to be introduced then into a second distilling stage, in which the vinyl chloride is distilled off.

It is known (cf. German Patents 857,957 and 899,191; U.S. Patent 2,724,006; and British Patent 938,824) that vinyl chloride can be prepared in the absence of catalysts in an empty steel tube by subjecting pure 1,2-dichloroethane to thermal dehydrochlorination in the vapor phase, at elevated pressure (varying e.g. between 9 and 38, preferably between 20 and 35 atmospheres absolute) and at temperatures varying between about 450 and about 650° C.

Undesirable side reactions are obviated by regulating the cracking temperature and by thereby allowing no more than an about ⅔ proportion of the 1,2-dichloroethane used to undergo reaction. The recovery in pure form of unreacted 1,2-dichloroethane (boiling point: 83° C.) by isolating it from its lower boiling impurities, so-called "low boiling fractions," which under practice conditions is a very expensive and costly commercial operation, substantially has not been described heretofore in literature. British Patent 938,824 cited above, alone uses a single distilling column for distilling off the low-boiling fractions from the 1,2-dichloroethane which, however, is known also to contain impurities boiling at a temperature higher than 83° C., i.e. so-called high-boiling fractions. Heretofore, the 1,2-dichloroethane freed from the low-boiling fractions has been distilled then to free it from the high-boiling fractions, and it has ultimately been refluxed with a purity e.g. of 99.9% into the cracking furnace. While the material can readily be distilled off from the high-boiling fractions in an undisturbed operation, it is technically difficult to isolate the low-boiling fractions. These difficulties result in continuous operation in the production facilities being interrupted, and they result in additional expense incurred by frequent cleansing of the distillation stage provided for the treatment of the low-boiling fractions. Furthermore, the removal of low-boiling fractions is found to entail losses in dichloroethane.

It has now unexpectedly been found that the low-boiling fractions, which are formed of a mixture of various unsaturated and saturated chlorinated hydrocarbons and benzene, can be transformed into high-boiling fractions in the presence of 1,2-dichloroethane by subjecting the said mixture to thermal treatment at a temperature of 450 to 650° C., preferably 500 to 600° C. The transformation entails no formation of novel low or high-boiling components other than those obtained by the cracking of dichloroethane, wherein pure starting material is used. The speed of transformation of the low-boiling fractions into high-boiling fractions has been expected and found to be a function of their concentration. For an about 5% by weight concentration of the low-boiling fractions in the dichloroethane used, the speed of transformation into high-boiling fractions has been found to be greater than the speed at which the low-boiling fractions are being formed on cracking dichloroethane into vinyl chloride and hydrogen chloride. Reverse conditions are found to prevail when the dichloroethane used contains the low-boiling fractions in a concentration of about 1% by weight. In this event, the low-boiling fractions concentrate first in the reaction mixture leaving the cracking furnace, unlike the impure dichloroethane used. These statements show that the proportion of low-boiling fractions contained in the reaction mixture leaving the cracking furnace is in a state of equilibrium, which is determined by both the speed of formation of the low-boiling fractions obtained on cracking the 1,2-dichloroethane, and the speed of transformation of those low-boiling fractions into high-boiling fractions. This state of equilibrium is not obtained when pure 1,2-dichloroethane is supplied to the cracking furnace. Furthermore, the state of equilibrium is found to depend on the heating of the dichloroethane cracking furnace.

The low-boiling fractions formed on cracking dichloroethane into vinyl chloride and hydrogen chloride substantially comprise benzene, 2 - chlorobutadiene-(1,3),1,1-dichloroethylene, 1,1 - dichloroethane, chloroform, methyl chloroform, ethyl chloride, carbon tetrachloride and other hydrocarbons. As the boiling points e.g. of benzene (80° C.) and 1,2-dichloroethane (83° C.) differ from one another by no more than 3 degrees, it has been necessary in earlier processes to separate the low-boiling fractions from the 1,2-dichloroethane by means of distilling columns of high separation efficiency, and simultaneously to use high reflux ratios. The presence of 2-chlorobutadiene-(1,3) considerably handicaps the distillation owing to the formation of polymers. At a concentration as low as about 10% of 2-chlorobutadine-(1,3) in the head product of the distilling column used for separating the low-boiling fractions, the polymerization of the 2-chlorobutadiene-(1,3) is found to impede continuous distillation for a period of some weeks. The column is required to be shut down in relatively short intervals of time, and more particularly the exit pipe (vapor pipe connecting the column head to the condenser), the condenser and its associated separator, and the whole reflux system are required to be freed completely from polymer.

Two distilling columns are the means customarily employed in industry for separating the low-boiling fractions from unreacted dichloroethane with the object of obtaining, in the bottom portion of the first column, dichloroethane freed practically completely from low-boiling fractions, and with the object of concentrating, in the second column, all of the components separated as the low-boiling fractions in admixture with 1,2 - dichloroethane. During this operation, disturbances caused by polymer formation are encountered particularly in the second column and the associated condenser including the reflux system and off-gas pipe. The speed of polymer formation has been experienced to depend on the concentration of the 2-chlorobutadiene-(1,3) in the head product of the distilling columns. This means that some slight concentration of the low-boiling fractions (corresponding to a concentration of considerably less than 10% of 2-chlorobutadiene-(1,3) in the mixture of low-boiling fractions) results in less frequent operative disturbances by polymer formation in the distilling stages for treatment of the low-boiling fractions. However, this is a commercially unattractive procedure as it results in lower vinyl chloride yields being obtained owing to higher loss in dichloroethane.

At a 10% by weight concentration of 2-chlorobutadiene-(1,3) in the mixture of the low-boiling fractions, which is withdrawn from the process, the average composition in percent by weight is found to be as follows:

| | |
|---|---|
| 2-chlorobutadiene-(1,3) | 10 |
| 1,2-dichloroethane | 77 |
| 1,1-dichloroethane | 7 |
| Benzene | 2.0 |
| Further chlorinated hydrocarbons | 4.0 |

The loss in 1,2-dichloroethane incurred at the above concentration of 2-chlorobutadiene-(1,3) in the effluent of the low-boiling fractions reduces the vinyl chloride yield by about 1%. At a concentration lower than indicated above and varying between 2.5 and 5.0% of 2-chlorobutadiene-(1,3) in the effluent of low-boiling fractions, which enables undisturbed distillation in the distilling stage of the low-boiling fractions for a period of some months, the loss in dichloroethane incurred results in the vinyl chloride yield being diminished at a rate as high as 2.1 to 4.5%.

The present invention relates more especially to a process for making vinyl chloride by subjecting 1,2-dichloroethane to an incomplete thermal cracking reaction, at elevated pressure and temperatures varying between about 450 and 650° C. in the absence of catalysts, wherein gas mixture leaving a cracking zone and formed of vinyl chloride, hydrogen chloride, unreacted 1,2-dichloroethane and of by-products including low-boiling fractions boiling at a temperature lower and high-boiling fractions boiling at a temperature higher than about 83° C. (760 mm. mercury), is partially condensed to be introduced into a first distilling stage, in which the hydrogen chloride is distilled off, and to be introduced then into a second distilling stage, in which the vinyl chloride is distilled off, the process comprising immediately introducing product obtained in the bottom portion of the second distilling stage into a third distilling stage, removing sump product formed of high-boiling fractions and obtained in the bottom portion of said third distilling stage, cooling the head portion of the third distilling stage and removing thereafter head product formed of a liquid mixture comprising unreacted 1,2-dichloroethane and low-boiling fractions, mixing the head product with fresh 1,2-dichloroethane, and recycling the resulting mixture into the cracking zone.

During each single passage through the cracking zone, an about 55 to 65% proportion of the 1,2-dichloroethane used is preferably subjected to thermal cracking into vinyl chloride and hydrogen chloride and the thermal cracking is conveniently achieved under a pressure varying between 8 and 40 atmospheres absolute.

Vinyl chloride prepared from impure 1,2-dichloroethane is found to have a degree of purity the same as the vinyl chloride obtained by cracking pure 1,2-dichloroethane, i.e. a purity of at least 99.9%, the distillation means necessary for separating the vinyl chloride from the cracked product being the same in the two cases. The substitution of impure 1,2-dichloroethane for pure 1,2-dichloroethane in the cracking process could not be found to impair the cracking reaction, e.g. to entail more rapid deposition of coke residues in the cracking tube.

The production of vinyl chloride from impure 1,2-dichloroethane as disclosed by the present invention offers the following advantages compared with earlier commercial processes.

(1) Omission of the distilling stage previously necessary for separating the low-boiling fractions from unreacted 1,2-dichloroethane. This distilling stage comprises one or two distilling columns including all of the equipment necessary to achieve distillation.

(2) The shutdown of these columns results in operative disturbances by polymer formation during the separation of the low-boiling fractions being no longer encountered. This naturally results in prolonged operation periods for the vinyl chloride plant, and it simultaneously results in lesser costs of repair in the absence of cleaning operations so often required to be carried out prior to this invention in this distilling stage. Furthermore, the shutdown enables energy, such as steam, electrical power, and cooling water, to be economized.

(3) High-boiling fractions alone are withdrawn from the process. They are present in an amount of about 0.70 to 0.90 kg. (product free from dichloroethane) per 100 kg. of vinyl chloride produced. When pure 1,2-dichloroethane is cracked, the sum of flow-boiling fractions plus high-boiling fractions is found to be equal to about 0.98 to 1.3 kg. product free from dichloroethane per 100 kg. of vinyl chloride produced. The comparison shows that the process of the present invention unexpectedly produces even less by-products.

(4) Losses in 1,2-dichloroethane as previously encountered in removing the low-boiling fractions from the unreacted 1,2-dichloroethane are obviated. This results in the vinyl chloride yield being increased.

The following examples illustrate the present invention with reference to prior art processes and with reference to the accompanying flow scheme.

Example 1.—Prior art process with separation of low-boiling fractions on recovering unreacted dichloroethane A mixing vessel 1 supplying 1,2-dichloroethane by means of a pump 2 into a cracking tube 3 was charged with two streams 4, 5 of various dichloroethanes formed of (a) 1,2-dichloroethane not transformed in the cracking process, which had been distilled and thereby freed from by-products originating from the cracking reaction, and which was supplied through a line 5, and of (b) fresh 1,2-dichloroethane which was supplied through a line 4 to replace the 1,2-dichloroethane proportion consumed during the cracking and work-up. In the present example, the mixture in mixing vessel 1 consisted of 56% of fresh 1,2-dichloroethane and 44% of recycled 1,2-dichloroethane. The two partial streams producing the mixture in the mixing vessel and the mixture were composed of:

| | B.P., °C. | Fresh 1,2-dichloroethane | Recycled 1,2-dichloroethane | Mixture in mixing vessel |
|---|---|---|---|---|
| 1,2-dichloroethane | 83 | 99.99% | 99.70% | 99.86%. |
| Benzene | 80 | | 0.29% | 0.13%. |
| Chloroform | 61 | 50 p.p.m.[1] | 20 p.p.m. | 40 p.p.m. |
| Methylchloroform | 74 | 20 p.p.m. | 20 p.p.m. | 20 p.p.m. |
| 1,1-dichloroethane | 56.5 | 70 p.p.m. | 20 p.p.m. | 50 p.p.m. |
| 2-chlorobutadiene-(1,3) | 59 | | 20 p.p.m. | 10 p.p.m. |
| 1,1-dichloroethylene | 31 | | 20 p.p.m. | 10 p.p.m. |

[1] P.p.m.: parts per million.

The dichloroethane was introduced into cracking tube 3 at a rate of 9.38 t./hr. under a pressure of 27 atmospheres absolute. The dichloroethane used as the feed had a temperature of about 40° C. The cracking tube 3 was placed in a furnace 6 heated by means of fuel oil or gas. On travelling through cracking tube 3, the dichloroethane supplied while liquid was preheated first, vaporized, then overheated and ultimated cracked at a temperature of about 500° C. The heating was appropriately regulated to permit no more than a 56% proportion of the dichloroethane to undergo conversion in the cracking zone of the cracking tube 3. The gas mixture leaving the cracking tube had a temperature of 525° C. under a pressure of 17 atmospheres absolute.

Under that pressure, the gas mixture was partially condensed at about 70° C. in cooler 7. The product portion which remained gaseous and the condensate were introduced into hydrogen chloride column 8 while the pressure was released to a value of about 12 atmospheres absolute. In that distillation stage 8, pure hydrogen chloride as the head product was recovered from the stream of products supplied in liquid and vapor form. The hydrogen chloride was obtained at a rate of 1853 kg./hr. It was very pure and could be used for further syntheses.

The product obtained in the bottom portion of column 8 contained the vinyl chloride formed in the cracking reaction (B.P.$_{760}$: −13.9° C.) together with the unreacted 1,2-dichloroethane. While the pressure was released to a value of about 5 atmospheres absolute, the mixture was introduced into a so-called vinyl chloride column 9, in which pure vinyl chloride (=3172 kg./hr.) was withdrawn from the head condensate of column 9. The product obtained in the bottom portion of vinyl chloride column 9 contained the 1,2-dichloroethane not transformed in the cracking tube and contained the low and high-boiling fractions formed in the cracking process. The temperature prevailing at the head of column 9 was maintained at 33° C., and the temperature prevailing in the bottom portion was maintained at 144° C. In order to enable that unreacted 1,2-dichloroethane to be recycled into the cracking process, crude 1,2-dichloroethane issuing through the bottom portion of vinyl chloride column 9 was conveyed, while the pressure was released to atmospheric, through a line 10 into a first column 11 receiving the low-boiling fractions, and the low-boiling fractions were allowed to concentrate in the reflux zone of that column 11. The formation of polymers in column 11 was limited by the means of introducing a portion of the refluxed material through a line 12 into a second column 13 also receiving the low-boiling fractions. These steps permitted maintaining approximately the following composition in percent by weight for the material refluxed in column 11:

| | |
|---|---|
| 1,2-dichloroethane | 94.50 |
| 1-chlorobutadiene-(1,3) | 2.20 |
| 1,1-dichloroethane | 1.76 |
| Benzene | 0.55 |
| Methylchloroform | 0.72 |
| Chloroform | 0.10 |
| Further constituents | 0.17 |

The portion of reflux material, which travelled through line 12 into column 13 receiving the low-boiling fractions, was concentrated further therein until the material refluxed in that column 13 contained 4.5% of 2-chlorobutadiene-(1,3). In order to maintain that concentration of 2-chlorobutadiene-(1,3) in the reflux of column 13 receiving the low-boiling fractions, it was necessary to withdraw from the material reflux in column 13 and ultimately to reject 150 kg./hr. of the effluent of low-boiling fractions containing about 89% of 1,2-dichloroethane, the low-boiling fraction effluent being withdrawn through a line 14. The bottom portion of column 13 contained 1,2-dichloroethane slightly contaminated with low-boiling fractions, and it was recycled through a line 15 into the upper portion of column 11.

The 1,2-dichloroethane issuing through the bottom portion of column 11 for the low-boiling fractions then exclusively contained high-boiling fractions. It was introduced through a line 16 into a column 17 receiving the high-boiling fractions. The head product of that column 17 consisted of pure recycled 1,2-dichloroethane (for analysis see above) which was introduced through line 5 into mixing vessel 1 at a rate of 4130 kg./hr. 34 kg./hr of high-boiling fraction effluent (including 1,2-dichloroethane) were withdrawn from the bottom portion of column 17 receiving the high-boiling fractions, and rejected. The temperature prevailing at the head of column 17 was 83° C.

The process described in the present example, wherein the low-boiling fractions highly diluted with 1,2-dichloroethane are withdrawn, was found over a period of some months substantially to entail no operative disturbances by polymer formation in the distilling stages 11 to 16 receiving the low-boiling fractions. It was found, however, considerably to reduce the yields in vinyl chloride and hydrogen chloride due to losses in 1,2-dichloroethane incurred on separation of the low-boiling fractions.

Vinyl chloride and hydrogen chloride were obtained in a yield of 95.7%. Low-boiling fractions did form at a rate of 16.5 kg./hr. (=0.31% of the 1,2-dichloroethane consumed); they were withdrawn from the process together with 133.5 kg./hr. of dichloroethane (=2.6% of the dichloroethane consumed). High-boiling fractions and residue were obtained in the above process at a rate of 24 kg./hr. (=0.46% of the dichloroethane consumed). The step of withdrawing the high-boiling fractions from the process results in a dichloroethane loss of 10 kg./hr. (=0.19% of the dichloroethane consumed).

Example 2.—Prior art process with separation of the low-boiling fractions on recovering unreacted dichloroethane 1,2-dichloroethane having the composition indicated in Example 1 was supplied from mixing vessel 1 into cracking tube 3. 11.6 tons/hr. of 1,2-dichloroethane were introduced into cracking tube 3 under a pressure of 35 atmospheres absolute. 60% of the dichloroethane supplied were allowed to undergo conversion in the cracking tube, the gas mixture issuing through the cracking tube at a temperature of 545° C. under a pressure of 22 atmospheres absolute and being partially condensed under that pressure in cooler 7. Hydrogen chloride and vinyl chloride formed in the cracking process were isolated, and unreacted dichloroethane was worked up in the manner set forth in Example 1, save that a higher concentration of low-boiling fraction was maintained in the material refluxed in column 11 receiving the low-boiling fractions, and in the reflux material of column 13 also receiving the low-boiling fractions. This resulted in a lesser quantity of the low-boiling fraction effluent being removed from the material refluxed in column 13.

Columns 11 and 13 both receiving the low-boiling fractions were operated under conditions which ensured that the material refluxed in column 13 had the following composition in percent by weight:

| | |
|---|---|
| 1,2-dichloroethane | 79.05 |
| 2-chlorobutadiene-(1,3) | 9.10 |
| 1,1-dichloroethane | 5.98 |
| Benzene | 2.50 |
| Further constituents | 3.37 |

In order to maintain that composition of the reflux material, 82.85 kg./hr. product (1.19% of the dichloroethane which underwent conversion) were required to be removed through line 14 from the material refluxed in column 13 receiving the low-boiling fractions, and to be withdrawn from the production facilities. This type of concentration was found to be accompanied by frequent operative disturbances due to the formation of polymers in distilling stages 11 to 16 for the low-boiling fractions.

The quantity of product withdrawn from column 17, receiving the high boiling fractions, was 42.85 kg./hr. (=0.62% of the total dichloroethane transformed).

Vinyl chloride was obtained at a rate of 4285 kg./hr. or in a yield of 97.45%, referred to the total dichloroethane transformed and hydrogen chloride was obtained at a rate of 2500 kg./hr. or in a yield of 97.45%, referred to the total dichloroethane transformed. Low and high-boiling fractions were obtained in a total quantity of 40.85 kg./hr. (product free from dichloroethane), corresponding to 0.59% of the total dichloroethane transformed. The separation of those by-products resulted in a loss in dichloroethane of 84.9 kg./hr. (=1.22% of the dichloroethane transformed).

Example 3.—Process of invention using impure 1,2-dichloroethane without separation of low-boiling fractions on recovering unreacted dichloroethane.

Dichloroethane of the quality grade described in Example 1 was conveyed from mixing vessel 1 to cracking tube 3. 5.6 tons/hr. were caused to travel through the cracking tube 3 under an initial pressure of 22 atmospheres absolute. About 60% of the dichloroethane used were allowed to undergo conversion by appropriately heating furnace 6. The gas mixture leaving the cracking tube was partially condensed at 60° C. under a pressure of about 13 atmospheres absolute, and hydrogen chloride was separated at the head of distilling column 8 under a pressure of about 10 atmospheres absolute. The product obtained in the bottom portion of column 8 was introduced into column 9 in which vinyl chloride was separated. The distillation was carried out under conditions the same as those used for separating the vinyl chloride in Examples 1 and 2. Product leaving through the bottom portion of vinyl chloride column 9, which essentially consisted of unreacted dichloroethane and the high and low-boiling fractions formed as by-products on cracking the 1,2-dichloroethane, were directly introduced through line 18, while omitting distilling stages 10 to 15 for treatment of the low-boiling fractions, into column 17 receiving those high-boiling fractions. These again were separated under conditions the same as those set forth in Examples 1 and 2.

The head product of column 17 receiving the high-boiling fractions was formed of unreacted dichloroethane, which contained all of the low-boiling fractions formed in this cracking process.

After some days of operation of the cracking plant, the 1,2-dichloroethane in the mixing vessel was found to be in a state of equilibrium as regards the impurities. The material was found to be approximately composed of (percent by weight):

| | |
|---|---|
| 1,2-dichloroethane | 95.80 |
| Benzene | 3.50 |
| 2-chlorobutadiene-(1,3) | 0.10 |
| Chloroform | 0.05 |
| 1,1-dichloroethane | 0.10 |
| Methylchloroform | 0.10 |
| Further constituents | 0.35 |

The above feed product used at the rate indicated above enabled 2092 kg./hr. of vinyl chloride to be obtained, corresponding to a yield of 98.66%, referred to the total quantity of 1,2-dichloroethane consumed, and enabled 1220 kg./hr. HCl=98.66%, referred again to the total quantity of 1,2-dichloroethane consumed, to be obtained. The quantity of high-boiling fractions (including the dichloroethane content) withdrawn from the bottom portion of column 17, receiving the high-boiling fractions, was 24.6 kg./hr. (=0.73% of the dichloroethane consumed per hour). The high-boiling fractions also included 6.1 kg. of 1,2-dichloroethane. Referred to product free from dichloroethane, the high-boiling fractions were obtained at a rate as low as 0.55%, referred to the total quantity of dichloroethane consumed.

The above statements indicate that the low-boiling fractions are conveniently allowed to remain in the unreacted dichloroethane. In addition to the advantages set forth above, this enables the vinyl chloride yield to be increased from 95.7% (Example 1) or 97.45% (Example 2) to 98.66%.

Example 4.—Process of invention using impure 1,2-dichloroethane without separation of low-boiling fractions on recovering unreacted dichloroethane 11.50 tons/hr. impure 1,2-dichloroethane were introduced into cracking tube 3 under an initial pressure of 36 atmospheres absolute. 56.5% of the dichloroethane were allowed to undergo conversion, and the gas mixture leaving the cracking furnace was partially condensed then under a pressure of 22 atmospheres absolute. Hydrogen chloride was separated from the cracked product under a pressure of 13 atmospheres absolute. The work-up was carried out in the manner set forth in Example 3.

After an operation period as short as 1 to 2 days, the product in mixing vessel 1 was found to have the following percent by weight composition which remained unchanged over a period of some months:

| | |
|---|---|
| 1,2-dichloroethane | 97.50 |
| Benzene | 2.20 |
| Methylchloroform | 0.05 |
| 1,1-dichloroethane | 0.08 |
| 2-chlorobutadiene-(1,3) | 0.04 |
| Chloroform | 0.04 |
| Further constituents | 0.09 |

Product was withdrawn from the plant in the following quantities per hour:

4050 kg./hr. vinyl chloride=98.7% yield,
referred to the dichloroethane consumed 2363 kg./hr. hydrogen chloride=98.7% yield,
referred to the dichloroethane consumed.

The effluent of high-boiling fractions (including the dichloroethane content) was 39 kg./hr.=0.6% of the total quantity of dichloroethane consumed. The content of dichloroethane in the effluent of high-boiling fractions was 25%.

We claim:

1. In the process for making vinyl chloride by subjecting 1,2-dichloroethane to an incomplete thermal cracking reaction, under a pressure of 8–40 atmospheres absolute and temperatures varying between about 450 and 650° C. in the absence of catalysts, wherein gas mixture leaving a cracking zone containing vinyl chloride, hydrogen chloride, unreacted 1,2-dichloroethane and by-products including low-boiling fractions boiling at a temperature lower and high-boiling fractions boiling at a temperature higher than about 83° C. at 760 mm. mercury, is partially condensed to be introduced into a first distilling stage, in which the hydrogen chloride is distilled off, and to be introduced then into a second distilling stage, in which the vinyl chloride is distilled off, the improvement which comprises immediately introducing product obtained in the bottom portion of the second distilling stage into a third distilling stage, cooling the head portion of the third distilling stage and removing thereafter head product formed of a liquid mixture consisting of unreacted 1,2-dichloroethane and low-boiling fractions, mixing the head product with fresh 1,2-dichloroethane, and recycling the resulting mixture into the cracking zone.

References Cited

UNITED STATES PATENTS

| 2,569,923 | 10/1951 | Cheney | 260—656 |
| 2,724,006 | 11/1955 | Krekeler | 260—656 |

FOREIGN PATENTS 938,824  10/1963  Great Britain.

BERNARD HELFIN, Primary Examiner

J. BOSKA, Assistant Examiner